Figure 1:
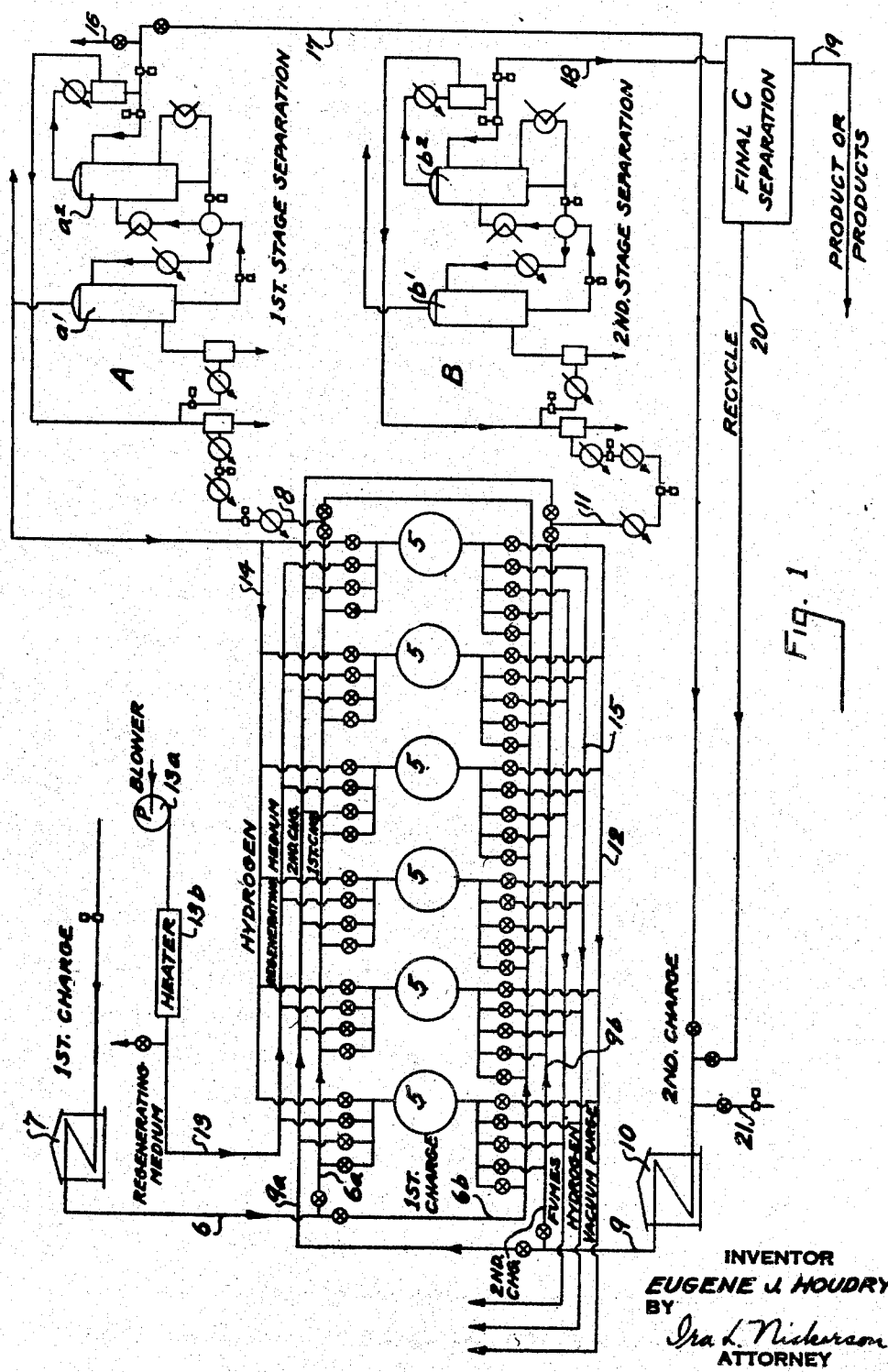

Patented June 24, 1947

2,423,029

UNITED STATES PATENT OFFICE 2,423,029

PROCESS FOR PRODUCING DIOLEFINS

Eugene J. Houdry, Ardmore, Pa., assignor to Houdry Process Corporation, Wilmington, Del., a corporation of Delaware Application July 18, 1942, Serial No. 451,413

6 Claims. (Cl. 260—680)

This invention relates to catalytic operations conducted in a cycle of alternating on-stream and regenerating reactions which is herein termed an adiabatic cycle since it is conducted without the use of an extraneous heat exchange medium to control the reactions. More particularly it has to do with dehydrogenating operations on organic compounds, hydrocarbons, for example, and with the making of base stock or materials, such as butylenes and propylene for the manufacture of alkylates, butadiene and styrene for the production of synthetic rubber, etc.

One object of the invention is to effect improvements in the use of catalysts and in the control of adiabatic operations. Another object is to utilize a single catalyst in a battery of converters to effect on-stream operations simultaneously on a number of different charging stocks in a continuing cycle. Still other objects will be apparent from the detailed description which follows.

Operating in an adiabatic cycle presents difficulty in effecting and maintaining balance between the heat in-put of the regenerating reaction (hereinafter referred to as "exotherm") and the heat loss of the on-stream reaction (hereinafter referred to as "endotherm") so that the contact mass will not deviate from the desired range of temperatures from cycle to cycle. For practically all commercial operations the burnable deposit from any desired reaction is either too small or too great for continuous operation in an adiabatic cycle. If too small, the temperature of the contact mass falls, and if too great its temperature rises, during successive cycles, with the result that the reaction either ceases entirely or proceeds beyond control impairing the life or activity of the catalyst and sometimes destroying the equipment. For this reason most commercial operations utilize an extraneous heat exchange medium to absorb excess amounts of heat when the latter is being liberated and to give up some or all of the stored heat when the reaction requires heat.

As a result of much study and experimentation I have found it to be commercially feasible to control reactions at temperatures above 850° F. within a range sufficiently restricted, as within 125° F., for example, the heat required for endothermic reactions being supplied by the burning of the deposit in alternating on-stream and regenerating operations. Temperature adjustment of the contact mass and control of quantity of burnable deposit is provided by utilizing more than one on-stream reactant. At least one reactant should absorb a substantial quantity of heat during conversion. It may also produce less burnable deposit than the other reactant or reactants. One reactant should be more refractory than the other, by reason of lower molecular weight and/or of higher degree of olefinic content. In the case of dehydrogenation of hydrocarbons saturates are generally more refractory than unsaturates containing the same number of carbon atoms and deposit less coke or burnable material on the catalyst. The on-stream reactants may be utilized in various ways in maintaining an adiabatic operation. They may be charged to the catalyst in separate reaction periods with interposed regenerating periods, or they may be charged to the catalyst during portions of the same reaction period, or the reactants may be mixed to form a single charge. Instead of utilizing a plurality of separate converters or batteries of converters to conduct converting operations on different charging stocks the present invention contemplates the use of a single catalyst in a single battery of converters to which the different charging stocks are sent in a definite order or cycle so that the requisite temperature and heat for the reactions is available at the proper time for each charging stock. To utilize the invention it is essential that the chosen catalyst be of suitable type to promote the desired reactions, that the reactions take place in the same or adjacent temperature ranges, and that the order of reactions and the operating conditions be adjusted to keep the catalyst in cycle and to avoid either runaway temperatures which produce undesirable side and secondary reactions or falling temperatures which slow and eventually stop the desired reactions. Among the dehydrogenating operations which I have found to be capable of being combined with profit are those involving production of butenes from butane, butadiene from normal butenes, styrene from ethyl benzene, aromatics from naphtha, etc.

Figure 2:
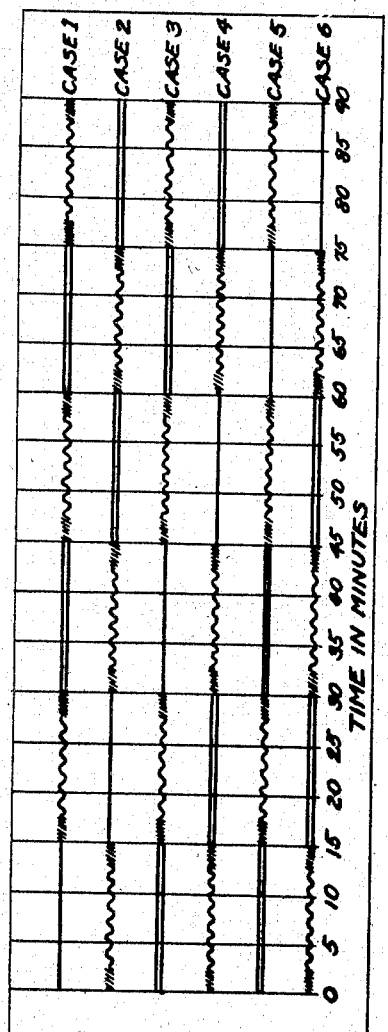
Figure 4:
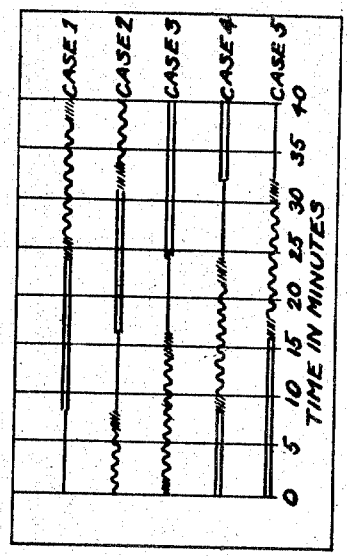
Figure 3:
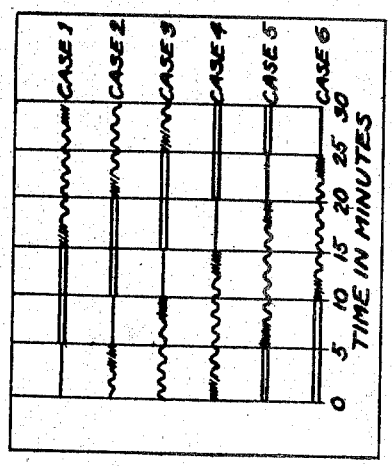

The accompanying drawings are illustrative of the invention and the manner of its use. Fig. 1 is a diagrammatic view, or flow chart, of a catalytic plant having a battery of converters. Figs. 2 to 4 inclusive are diagrams of operative cycles for plants of the type shown in Fig. 1.

Flow chart (Fig. 1) shows diagrammatically a battery of catalytic converters 5 of any suitable or desired type and of any desired number. These converters are shown in a battery of six to conform to operating cycles of Figs. 2 and 3. One charge may be fed to the battery by line 6, which has valved branches 6a and 6b connected to the opposite ends of each of converters 5 so that the charge can be fed to and through the converters in either direction after passing through heater 7. Either branch will be utilized to carry away the products of the reaction when the other branch is utilized for feeding the charge, the products passing by line 8 into the first stage separation zone A. Similarly, the second charge is fed simultaneously to the battery of converters by line 9 after passing through heater 10, line 9 having valved branches 9a and 9b extending to the opposite ends of each of the converters 5. One of the branches is used to remove the products of the reaction when the other branch is used to feed the charge, the products passing by line 11 to the second stage separation zone B. In order to purge the converters before and after regeneration a vacuum purge line 12 is provided having valved connections to each of converters 5. A regenerating medium for removing contaminated deposit from the catalyst in converters 5 is supplied to each converter by valved branches from supply line 13. Usually air or air diluted by flue gas is utilized as the regenerating medium and may be sent into line 13 by blower 13a, the medium being raised to the proper temperature by being sent through a suitable heater 13b. Under certain conditions and with certain charging stocks it is desirable to effect reduction of the catalyst prior to an on-stream operation. For this purpose there is provided a hydrogen supply line 14 which has valved branches connected to each of converters 5. Another line 15 for removing hydrogen is provided having valved branches from the opposite ends of the converters.

Separation of the products can be effected by any suitable or desired equipment. Hence, disclosure thereof is largely diagrammatic and detailed description is unnecessary. Each separation stage will include suitable heat exchangers, vacuum pumps or compressors, and connections for recirculation and refluxing to give the desired fractionation. Accordingly, separation zone A includes fractionator $a^1$ for removing the lightest products from the first stage operation (mostly hydrogen of which some or all may go to hydrogen line 14) and stabilizer or fractionator $a^2$ to separate out the desired product or products of the first charge operation, which products may be removed by line 16, or if suitable for the second charge, may be sent by line 17 directly to heater 10 and charge line 9. The second stage separation zone B may be similar to zone A and include fractionator $b^1$ for removal of hydrogen and light fixed gases and stabilizer or fractionator $b^2$ for the remaining products which leave zone B by line 18. If necessary or desirable line 18 may lead to a final separation zone C containing equipment of any known or desired type from which the desired product or products leave by line 19, while any materials of the general composition of the second charge may be sent as recycle to heater 10 by line 20. As an alternative, the second charge may be furnished by line 21.

Converters 5 may be of any known or desired type but adiabatic operations to effect dehydrogenation are advantageously conducted with contact masses containing heat absorbing material to the extent of 40 to 80% of the mass. Such heat absorbent material should be inert or of low catalytic activity and such activity as it possesses should not adversely affect the reaction, particularly in the direction of increased deposit on the contact mass. Suitable materials for heat absorption and the general principles of adiabatic operation are disclosed in my copending application Serial No. 439,338, filed April 17, 1942 and a desirable form of converter permitting convenient charge and discharge of the contact mass is disclosed in my copending application Serial No. 437,687, filed April 4, 1942, which issued April 15, 1947 as Patent No. 2,418,837. The active part of the contact mass which normally ranges between 20 and 60% of the mass may be any of the known dehydrogenating catalysts, such as the oxides of chromium, tungsten, molybdenum, etc., on suitable active or inactive supports, such for example as active or Activated Alumina. For many dehydrogenating operations to be controlled adiabatically a good contact mass comprises 33% by volume active material (23% by weight chromic oxide on Activated Alumina) and 67% by volume of heat absorbing material (fused alumina). The active catalytic material is in the form of pellets of uniform size (4 x 4 mm. cylinders) and the fused alumina in the form of fragments about the same size as the catalyst pellets (4 to 8 mesh), the active and heat absorbent parts being uniformly mixed together.

By the present invention a plurality of reactions including two dehydrogenation operations can be simultaneously conducted in the same battery of converters, the reactions being arranged to complement one another so that runaway temperature conditions are avoided and the contact mass is maintained in the desired operating range. To accomplish this, one on-stream charge may be converted at somewhat higher temperature than the other. Also one on-stream charge should lay down less burnable deposit on the catalyst than the other. Saturated hydrocarbons usually are more refractory than unsaturated hydrocarbons and accordingly can be converted at the higher temperatures and form less burnable deposit. Examples of saturates are ethane, propane, butane, pentane, etc. Examples of unsaturates are iso and normal butylenes, pentenes, etc.

Figs. 2, 3 and 4 show typical cycles in the practice of the invention. Fig. 2 shows a ninety minute cycle for a six case plant in which the operating periods are fifteen minutes long. Each converter has one on-stream period of fifteen minutes on a saturate charge, such as butane for example, followed by regeneration and then the next two on-stream periods are with an unsaturate charge, or mixture of saturates and unsaturates. Thus, the cycle provides for continuous operation with one converter always on stream with the saturate charge and two converters always on stream with unsaturate charge and three converters always in various stages of regeneration. The two on-stream periods on unsaturate charge produce a rise in the temperature of each converter which is corrected by the subsequent on-stream period with the saturate charge, the reaction on the latter consuming a greater amount of heat but producing less coky deposit than results from either period on unsaturate charge. A short reduction period for the catalyst in advance of each on-stream period is desirable but is not indicated in Fig. 2. Fig. 3 shows a slightly different arrangement in which the time cycle is reduced to thirty minutes. Six cases are used with one case always on-stream with saturate charge and two cases always on-stream with unsaturate charge and three cases always in regeneration. In this cycle the reaction periods are always fifteen minutes but the first five minutes of each on-stream period utilizes saturate charge, while the following ten minutes of each period utilizes unsaturate charge. Reduction of the catalyst is usually unnecessary during the regeneration periods because the saturate charge fed at the beginning of the on-stream period seems to effect what little reduction of the catalyst is desirable prior to the feeding of the unsaturate charge.

It has been found that when both types of charge are sent during the same on-stream period, the saturate charge at the beginning and for a shorter time than the unsaturate charge, the deposit of burnable material on the catalyst does not require a regenerating period of the same length as the on-stream period. Hence, Fig. 4 shows an operative cycle of forty minutes' duration in which only five cases are required in the battery of converters to have one case always on stream with the saturate charge and two cases on stream with the unsaturate charge. The on-stream period is twenty-four minutes with eight minutes used for the saturate charge and sixteen minutes for the unsaturate charge. A regenerating period of sixteen minutes is ample to maintain the catalyst in proper condition.

The cycles shown in Figs. 2 to 4 are particularly adapted for operations on gaseous hydrocarbons, such as $C_5$'s and lighter. The same principle of operation can be employed when one of the charging stocks is not gaseous, nor for that matter need it be unsaturated provided it tends to lay down too large an amount of burnable deposit. Naphthas, either straight run or cracked, may be dehydrogenated to produce aromatics and/or alkyl aromatics, for example, benzol, toluol and its homologues, or styrene and its homologues. The naphtha reforming or dehydrogenation may precede or follow an endothermic reaction period which produces limited quantities of burnable deposit or practically none at all, for example dehydrogenation of normal or iso-aliphatics containing five carbon atoms or less. Hydrogen added to naphtha feed, particularly at atmospheric or higher pressures, reduces coke deposit and permits the charging of greater quantities of such feed. Sequential dehydrogenations in the type of cycle shown in Fig. 2 or Fig. 3 permit far reaching or deep conversion of naphtha and the deposition of a substantial quantity of coky deposit which on burning provides the "exotherm" of the adiabatic cycle. When the naphtha conversion is exothermic, or only slightly endothermic, as in destructive hydrogenation or hydroforming, balancing "endotherm" is provided by the dehydrogenation of paraffinic or other saturated gases. Recirculation or successive passes on naphthas or other hydrocarbon mixtures boiling up to 500° F. increases the concentration of aromatics in the product. In general aromatic (cracked or reformed) naphthas produce less burnable deposit than paraffinic naphthas. To obtain specific products such as toluene, xylene and styrene it is preferable to use close cut naphthas as feed. For example, to produce styrene the feed may be ethyl benzene or a naphtha concentrated in ethyl benzene; for benzol, lower boiling straight run naphthas, as in the boiling range of 100 to 250° F. are preferable; for xylene, somewhat heavier naphthas, as in the 200 to 300° F. boiling range, are preferred.

Instead of sending the charging stocks separately for conversion it is entirely feasible to mix them together in the proper proportions to form a single charge if generally lower yields of products from each charge are obtained and are not objectionable. When the feeds are mixed to form a single charge and the cycle involves equal time periods for on-stream and regenerating periods, only two converters are needed in the battery of converters for continuous operation. One adaptation of this aspect of the invention is in the production of butadiene by dehydrogenation of normal butenes. Propane may be added to the butenes to serve as the portion of the charge which reduces the coke deposit and absorbs heat by undergoing dehydrogenation. The quantity of propane which is needed dilutes substantially the main reactant, butene, but the yield of butadiene per pass based on the quantity of butene in the charge compares favorably with the yields obtained when utilizing cycles in which butenes or $C_4$'s highly concentrated in butenes are fed alone, as in cycles of Figs. 2, 3 and 4.

In the following examples, which are illustrative of the use of the invention, all the operations were conducted in converters having a 36" depth of contact mass with straight-through flow of reactants from end to end of the bed and the contact mass in all instances was the same, namely the one heretofore mentioned consisting of 33% by volume active material (23% by weight chromic oxide on Activated Alumina) and 67% by volume of heat absorbing material (fused alumina).

EXAMPLE 1

*Object.*—To produce butadiene by 2 step dehydrogenation operation.

*Cycle.*—The 90 minute of Fig. 2.

*On-stream feed stocks*

| Normal Butane | Butene |
| --- | --- |
| (Ordinary Refinery Production) | Mixture of butenes and butane in the volumetric proportions of about 3:1, of which the following is a typical analysis: N-butane, 26.7 N-butene, 71.9 Butadiene, 1.4 Calculated Gas Gravity, 1.96 |

*On-stream operating conditions*

| | Butane Charge | Butene Charge | |
| --- | --- | --- | --- |
| | | 1st On-Stream Period | 2nd On-Stream Period |
| Charging Rate | 12 grams per minute per liter of active catalyst. | 22 grams per minute per liter. | 22 grams per minute per liter. |
| Pressure | 25 inches of vacuum or 5 inches of mercury absolute. | 25 inches of vacuum or 5 inches of mercury abs. | 25 inches of vacuum or 5 inches of mercury abs. |
| Temperature (Avg.) at— | | | |
| Beginning | 1100° F | 1065° F | 1075° F. |
| End | 1055° F | 1030° F | 1040° F. |
| Time | 15 minutes | 15 minutes | 15 minutes. |

*Pod analysis of products of on-stream operations*

| | | | |
| --- | --- | --- | --- |
| Hydrogen | 1.5 | 1.0 | 0.9 |
| Methane | 0.4 | 0.3 | 0.2 |
| $C_2$ | 0.4 | 0.4 | 0.4 |
| $C_3$ | 0.2 | | 0.4 |
| Isobutane | | | |
| N-butane | 57.2 | 19.8 | 19.4 |
| Iso-butene | | | |
| N-butene | 35.0 | 60.9 | 62.1 |
| Butadiene | 4.1 | 14.7 | 14.4 |
| $C_5+$ | | 0.8 | |
| Coke | 1.2 | 2.1 | 2.2 |
| | 100.0 | 100.0 | 100.0 |
| Calculated density | 1.38 | 1.51 | 1.55 |

The $C_4$ cut from the butene conversions after separation of butadiene was recycled by adding the same to the $C_4$ products of the butane conversion after the manner indicated in Fig. 1 of the drawing, the ratio of recycle to products of butane conversion being approximately 3:1 to give the composition of the butene feed stock shown above.

In this operation regenerating medium was sent through the converters always in the same direction, but the direction of feed of on-stream reactants was reversed in each converter at the end of each regenerating period.

EXAMPLE 2

*Object.*—To produce butadiene by 2 step dehydrogenation operation.
*Cycle.*—The 30 minute cycle of Fig. 3.

On-stream feed stocks

| Normal Butane | Butene |
|---|---|
| (Ordinary Refinery Production) | Same as in Example 1 |

On-stream operating conditions

| | Butane Charge | Butene Charge |
|---|---|---|
| Charging Rate | 12 grams per minute per liter of active catalyst. | 17 grams per minute per liter of active catalyst. |
| Pressure | 25 inches of vacuum or 5 inches of mercury absolute. | 25 inches of vacuum or 5 inches of mercury absolute. |
| Temperature (Avg.) at— | | |
| Beginning | 1035° F | 1025° F. |
| End | 1025° F | 995° F. |
| Period | 5 minutes | 10 minutes. |

Pod analysis of products of on-stream operations (weight per cent based on charge)

| | | |
|---|---|---|
| Hydrogen | 1.4 | 0.9 |
| Methane | 0.2 | 0 |
| $C_2$ | 0 | 1.4 |
| $C_3$ | 0 | 0 |
| Isobutane | | 3.4 |
| N-butane | 68.6 | 33.6 |
| Isobutene | | |
| N-butene | 21.4 | 41.6 |
| Butadiene | 8.0 | 17.3 |
| $C_5$+ | 0 | 0 |
| Coke | 0.4 | 1.8 |
| | 100.0 | 100.0 |
| Calculated Gas Gravity | 1.43 | 1.54 |

There was the same recycling as in Example 1. There was reversal of direction of on-stream feed in each cycle after regeneration.

EXAMPLE 3

*Object.*—Production of unsaturates including butadiene and base stock for alkylate.
*Cycle.*—40 minutes—20 minutes on-stream periods and 20 minute regenerating periods—requiring a battery of 8 converters for continuous operation. The cycle is a modification of that shown in Fig. 3. In the 20 minute on-stream period propane was charged for 5 minutes, butene for 10 minutes and butane for 5 minutes.

Charging stocks

| Propane | Butene | Butane |
|---|---|---|
| (Less than 5% propene) | (As in Example 1) | (Ordinary Refinery Production) |

On-stream operating conditions

| | Propane | Butene | Butane |
|---|---|---|---|
| Charging Rate | 22 grams per minute per liter of active catalyst. | 22 grams per minute per liter. | 12 grams per minute per liter. |
| Pressure | 25 inches vacuum | 25 inches vacuum. | 25 inches vacuum. |
| Temperature (Avg.) at— | | | |
| Beginning | 1090° F | 1070° F | 1025° F. |
| End | 1070° F | 1025° F | 1005° F. |
| Time | 5 minutes | 10 minutes | 5 minutes. |

Pod analysis of products of each charge (weight per cent based on charge)

| | Propane | Butene | Butane |
|---|---|---|---|
| Hydrogen | 1.6 | 1.3 | 1.5 |
| Methane | 1.0 | 0.2 | 0.3 |
| Ethanes | 1.3 | 0.0 | 0.0 |
| Propanes | 73.5 | 0.3 | 0.3 |
| N-butane | | 21.2 | 58.8 |
| N-butene | | 58.2 | 35.8 |
| Butadiene | | 17.6 | 3.0 |
| Coke | 0.2 | 1.2 | 0.3 |
| Propene | 22.4 | | |
| | 100.0 | 100.0 | 100.0 |

EXAMPLE 4

As a variant on Example 3 the propane and the butene charges were mixed together in the ratio of 1:2 to form a single charge and fed to the catalyst for 12 minutes, followed by the charging of the butane for 6 minutes to give an on-stream period of 18 minutes. The regenerating period was also 18 minutes giving an overall cycle of 36 minutes somewhat similar to the cycle illustrated in Fig. 3. This variant required only six converters in the battery for continuous operation. The per cent of conversion of the butenes was essentially the same as in Example 3.

EXAMPLE 5

*Object.*—To produce unsaturates from butane by dehydrogenation and aromatics from naphtha by reforming.
*Cycle.*—45 minute cycle made up of equal on-stream and regenerating periods (22½ minutes each) requiring six converters in the battery-cycle similar to Fig. 3.

Charging stocks

| Butane | Naphtha |
|---|---|
| (Ordinary Refinery Production) | Straight-Run Heavy East Texas 52° A. P. I.—Boiling Range 200–400° F. |

On-stream operating conditions

| | | |
|---|---|---|
| Charging Rate | 12 grams per minute per liter of active catalyst. | 19 grams per minute per liter of active catalyst. |
| Pressure | 23 inches vacuum or 7 inches mercury absolute. | 7 lbs. per sq. in. gauge. |
| Temperature (Avg.) at— | | |
| Beginning | 1055° F | 1020° F. |
| End | 1020° F | 950° F. |
| Period | 15 minutes | 7½ minutes. |

*Pod analysis of on-stream products of butane*

| | Weight per cent of charge |
|---|---|
| Hydrogen | 1.2 |
| Methane | 0.3 |
| Ethane+ | 0 |
| Propane+ | 0.3 |
| Isobutane | 0 |
| N-butane | 65.1 |
| Isobutene | 1.7 |
| N-butene | 25.9 |
| Butadiene | 3.8 |
| $C_5+$ | 0 |
| Coke | 1.7 |
| | 100.0 |

*On-stream products of naphtha (fractional analysis of residual liquid)*

| Boiling Range | Vol. per cent of Liq. Product | Vol. per cent Aromatics | Vol. per cent Olefins | Vol. per cent Paraffins | Vol. per cent Naphthenes | Total per cent |
|---|---|---|---|---|---|---|
| Initial to 208° F. (Benzene Cut) | 8 | 30 | 30 | 30 | 10 | 100 |
| 208° to 250° F. (Toluene Cut) | 17 | 60 | 5 | 20 | 15 | 100 |
| 250° to 305° F. (Xylene Cut) | 30 | 70 | 5 | 15 | 10 | 100 |
| 305° to End Point | 45 | 90 | 0 | 5 | 5 | 100 |
| | 100 | | | | | |

At normal operation of an "on-stream period" of 7½ minutes with average catalyst temperature of 950° to 1000° F. and an average feed rate of 18–20 grams per minute per liter of active catalyst, carbon in the amount of about 4 per cent by weight of the charge, is deposited upon the catalyst.

When the heavy naphtha product is recycled, the aromaticity of the product is increased with each successive recycle pass in the following approximate amounts:

Product:
Per cent by weight of initial —320° F. fraction
- First pass _____ 30
- Second pass _____ 70
- Third pass _____ 80

The approximate weight balance for the entire three pass operation is as follows:

Per cent by weight based on naphtha charged
- Carbon _____ 9.5
- Gaseous product _____ 49.5
- Residual liquid _____ 41.0
- _____ 100.0

As an alternative operation to the one given above, the heavy naphtha may be charged at the same feed rate and at the same temperature of the catalyst bed, at a reduced pressure of 5–7 inches absolute rather than at the positive pressure shown above. In this operation, aromatics with olefinic side chains which will polymerize readily, such as styrene, are produced in amounts above 4% by weight of the charge, as part of a highly aromatic product.

EXAMPLE 6

*Object.*—To produce unsaturates in a single step utilizing a single mixed charge.

*Cycle.*—20 minutes—with on-stream and regenerating periods of equal length—only two converters needed in the battery for continuous operation.

*On-stream feed stock*

A mixture of about 63% propane and 37% $C_4$'s (largely butenes).

*On-stream operating conditions*

Charging rate.—15.8 grams per minute per liter of active catalyst.
Pressure.—25 inches vacuum or 5 inches mercury absolute.
Temperature (avg.):
  At beginning _____ °F__ 1045
  At end _____ °F__ 1025
Period.—10 minutes.

*Pod analysis of charge and product*

| Charge | Charge, Weight Per cent | Product, Weight Per cent Based on Charge |
|---|---|---|
| Hydrogen | | 1.2 |
| Methane | | 0 |
| Ethane | 0.2 | 1.5 |
| Ethene | 0 | 0.4 |
| Propane | 63.1 | 49.9 |
| Propene | 0.4 | 12.8 |
| Isobutane | | |
| N-butane | 2.4 | 2.8 |
| Isobutene | Trace | Trace |
| N-butene | 33.5 | 22.8 |
| Butadiene | 0.4 | 7.4 |
| $C_5+$ | | 0 |
| Coke | | 1.2 |
| | 100.0 | 100.0 |

Propane and butenes were used to make up the feed stock. The propene produced was used to make alkylate. The butadiene yield was about 22% based on the butene charge.

I claim as my invention:

1. In effecting dehydrogenation of paraffinic and olefinic hydrocarbons to produce corresponding olefins and diolefins, respectively, the process comprising subjecting a paraffinic hydrocarbon of from four to five carbon atoms to dehydrogenation in the presence of a bed of dehydrogenation catalyst under conditions at which there is substantial and practically clean dehydrogenation of the same to the corresponding olefin, subjecting said bed of catalyst to a recurring cycle wherein it is alternately contacted with aliphatic hydrocarbon charge including said paraffin and regenerated by burning of deposit resulting from conversion of said charge, effecting the contacting portion of said cycle under conditions such that the catalyst bed supplies heat of conversion of said charge with resultant progressive decrease in catalyst temperature within a range throughout which there is substantial dehydrogenation of said charge and the regenerative portion of the cycle under conditions such that the heat resulting from burning of said deposit is retained by said catalyst bed with resultant increase of its temperature substantially equal to its aforesaid temperature decrease, feeding during the contacting portion of the cycle in addition to the aforesaid paraffin an olefin of the same number of carbon atoms which is dehydrogenated in the presence of said catalyst and within the temperature range of said cycle to produce in addition to the corresponding diolefin coky deposit in excess of the amount which restores to the catalyst bed during its regeneration the heat absorbed by conversion of said olefin, and so controlling the proportion of olefin to paraffin feed that the total coky deposit produces upon burning and stores within the catalyst bed substantially the quantity of heat released by the same to conversion of the total charge.

2. Process according to claim 1, wherein the paraffin and olefin charge components are fed to the catalyst bed simultaneously.

3. Process according to claim 1, wherein the paraffin and olefin charge components are fed separately to the catalyst bed.

4. Process according to claim 1, wherein the paraffin and olefin charge components are normal butane and normal butene, respectively.

5. Process according to claim 1, wherein paraffin charge and olefin bearing charge are fed separately to the catalyst bed for distinct onstream periods which are separated by regeneration periods.

6. Process according to claim 1, wherein paraffin charge and olefin bearing charge are fed separately to the catalyst as part of a single onstream period.

EUGENE J. HOUDRY.

REFERENCES CITED

The following references are of record in the file of this patent:

UNITED STATES PATENTS

| Number | Name | Date |
| --- | --- | --- |
| 2,244,612 | Crowley, Jr. | June 3, 1941 |
| 2,291,234 | Kassel | July 28, 1942 |
| 2,295,730 | Grote | Sept. 15, 1942 |
| 2,270,715 | Layng et al. | Jan. 20, 1942 |
| 2,290,845 | Voorhees | July 21, 1942 |
| 2,178,584 | Grosse | Nov. 7, 1939 |
| 2,253,486 | Belchetz | Aug. 19, 1941 |
| 2,209,215 | Wiezevich | July 23, 1940 |
| 2,377,087 | Linn | May 29, 1945 |
| 2,356,697 | Rial | Aug. 22, 1944 |
| 2,124,567 | Grosse | July 26, 1938 |
| 2,395,058 | Mattox | Feb. 19, 1946 |